United States Patent Office 2,753,893
Patented July 10, 1956

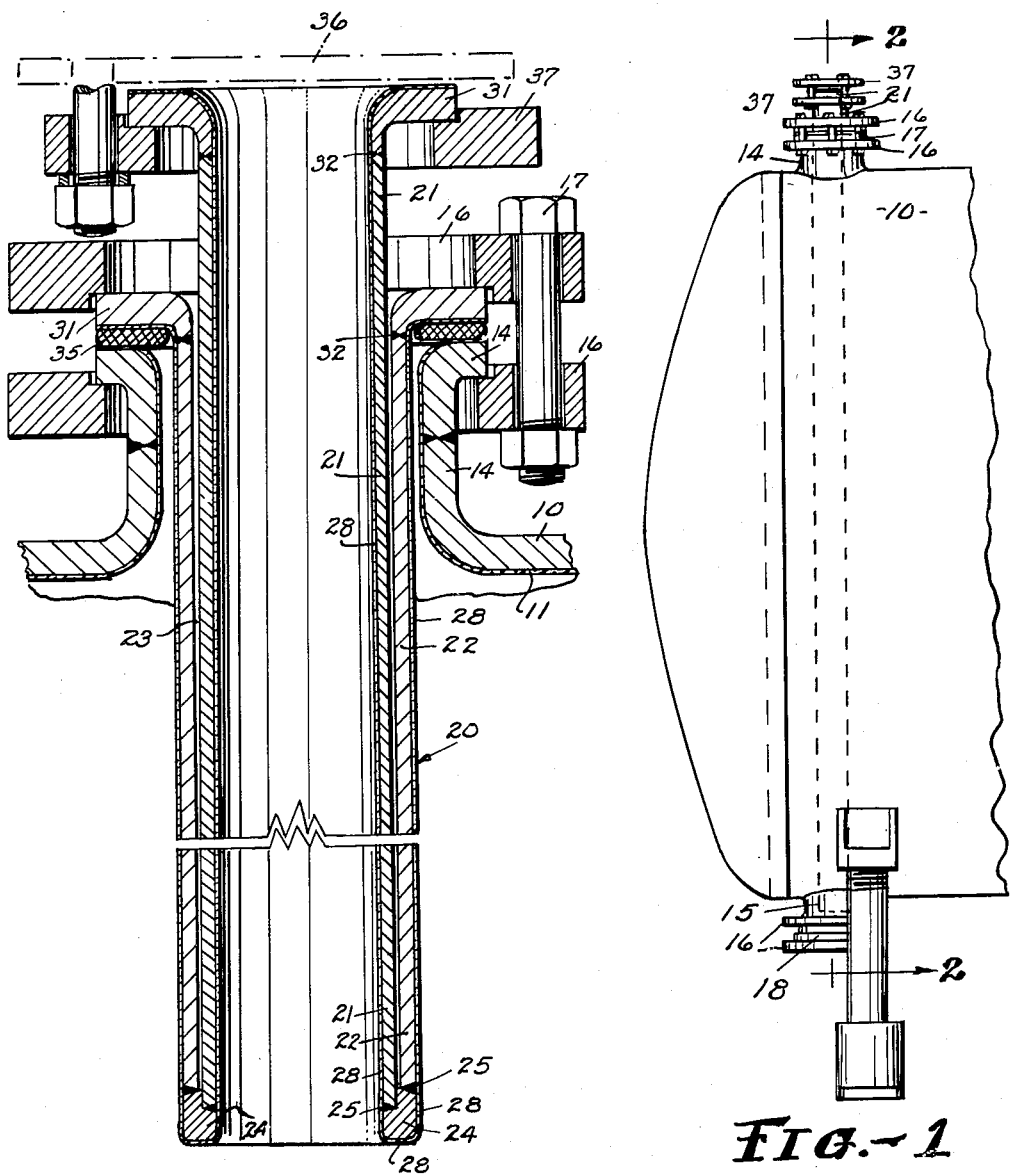

2,753,893

DIP TUBE FOR TANKS AND THE LIKE

Carl S. Brown, Lakewood, Ohio, assignor to Glascote Products, Inc., Cleveland, Ohio, a corporation of Ohio Application February 8, 1952, Serial No. 270,691

10 Claims. (Cl. 138—68)

This invention relates to improvements in dip tubes or "blow legs" for use in tanks, autoclaves and the like. The invention is particularly concerned with improvements in or relating to an improved dip tube for use in enclosed pressure vessels or tanks in which materials are treated in a fluid or semi-fluid state, as for instance by heating or chemical reaction, and wherein the exposed surfaces of the tube within the tank are protected by a corrosion protective coating such as a vitreous glass enamel. These, therefore, are the general objects of the present invention.

Dip tubes of the type with which the present invention is particularly concerned are sometimes referred to as "blow legs." Such a dip tube generally comprises an elongated metal tube open at its ends and extends through a suitable opening in a pressure vessel or tank from a point exterior of the tank through the tank wall to a point within the tank. The tube generally is removably secured to the wall of the tank in such manner as to provide a fluid tight joint therebetween. The outer end of the tube is usually closed by a removable cap to make the tubes pressure-tight. The arrangement is such that the cap may be readily removed and materials introduced into the tank or removed from the tank through the tube.

Dip tubes may be used for several purposes. They may be used to allow the injection of a material, usually a liquid or a gas into a pressure vessel at a given point. For instance, when using an agitator equipped vessel to contain a liquid in which a gas is to be dispersed, it is often desirable to introduce the gas at a point adjacent the path of the agitator. Such tubes are also used to empty a vessel, particularly where openings in the bottom of the vessel are undesirable. When used for the latter purpose the tubes generally project through the top wall of the vessel and extend into a sump at the bottom thereof. The vessel is then emptied of its liquid contents by applying pressure, generally by a gas, above the liquid level, thereby forcing the liquid out through the tube. Such use of the tube has resulted in its being referred to as a "blow leg."

The vessels or tanks, with which the dip tubes of the present invention are used, often are employed in connection with corrosive materials. Accordingly, it is customary to provide the internal surfaces of the tank with a protective coating such as a vitreous enamel formed by a glass composition. Generally, these protective coatings or linings are formed by applying a suitable glass slip to the internal walls of the tank or vessel following which the vessel is placed in an oven and heated until the glass slip is fused to the metal surfaces to which it was applied, thereby forming a glass coating which will protect the vessel surfaces by making them either acid or alkali resistant as desired.

The dip tubes, which generally extend from an external point above the tank to a point adjacent the bottom thereof, likewise have their surfaces which are exposed to the tank contents, coated with a corrosion-resistant coating. Like the tank the dip tubes are generally coated with a vitreous enamel, as for instance a glass composition, which is fused to the metallic surfaces of the tube. In use an open end of the tube extends into the tank and accordingly both the inner and outer surface of the tube must be provided with a protective coating. In the application of the enamel coating to the tank and the dip tube considerable difficulty has been encountered in avoiding defects which materially reduce the corrosive resistant qualities of the coating. One of these defects is the lack of adherence of the enamel or glass coating to the metal surfaces. This is, of course, apparent as the enamel coating is easily parted from the steel or other metal surface to which it was applied. Among the other defects is the appearance of "fish scale" in the coating. This appears as a scattered chipping of the enamel from the metal surface. The resemblance of the chips to fish scales is common and hence the term "fish scale" is used. The disadvantages of these defects are well-known in the art. Such defects become particularly prominent in the coating of articles, such as dip tubes, where both surfaces of the metal are coated.

It has been more or less generally accepted that both "fish scales" and the lack of adhesion are caused during the firing of the enamel coating by the evolution of a gas, particularly hydrogen, from the steel or other metal to which the enamel is applied. In the past it has been customary to use an adherence promoting oxide in the enamel frit to increase the adherence of the coating to the metal surfaces to which it is applied.

The use of such adherence promoting oxide, to a great extent, has decreased the difficulties encountered in coating the internal surfaces of the tank. However, the coating of the inner and outer surfaces of metallic dip tubes, even when using a porcelain enamel frit containing an adherence promoting oxide is far from satisfactory. This I believe is due to the fact that the dip tubes of comparatively small diameter and are hence therefore subjected to peculiar strains during the firing and subsequent cooling operation, and to the fact that both the inner and outer surfaces of the tube are coated, which makes it more difficult for the gases to escape from the metal. Accordingly, one of the objects of the present invention is to provide an improved dip tube together with a method of manufacturing the same which will facilitate the enameling of the inner and outer surfaces of the tube so as to prevent or materially reduce the defects in the enameled surfaces.

According to the invention the dip tube comprises two elongated tubular members telescopically arranged one to the other, and of such diameters that the internal wall of the outer tube is spaced from the external wall of the inner tube. The bottom edges of the two tubes are joined together and the lower end of the gap or space between the two tubes is closed whereupon a continuous coating of enameling slip is applied to the inner surface of the inner tube, the outer surface of the outer tube, the external surfaces of the joint between the tubes, and the closure for the gap. The entire unit is then placed in an oven and fired with the result that the gases may be liberated from the inner surface of the outer tube and the outer surface of the inner tube and escape through the space between the tubes, which at its upper end is open, without passing through the molten glass. Further it is desirable that the two tubes be joined at their lower ends by an annular metallic ring which bridges the gap between the two tubes and to which the tubes are secured independently as by welding.

The other objects and advantages of the present invention will become more apparent from the following description of one embodiment of this invention which is illustrated in the accompanying drawings. The essential features of the invention will be summarized in the claims.

In the accompanying drawings, Fig. 1 is a fragmentary elevation of a tank having the improved dip tube incorporated therein; Fig. 2 is a vertical section through the dip tube and associated parts of the tank, the plane of the section being indicated by the line 2—2 on Fig. 1.

In the drawings, there is illustrated a tank or pressure vessel 10, the walls of which are formed of sheet metal. The internal surfaces of the vessel 10 are provided with a vitreous enamel or glass coating 11 which, as heretofore mentioned, is applied in the form of a slip and fused to the surface of the metal in an oven. In the present embodiment the bottom and top of the tank are provided with flanged openings 14 and 15. The flanged opening 14 at the top of the tank provides an opening through which a dip tube generally indicated at 20 projects. This tube is secured to the flange of the opening 14 by coupling flanges 16 which are secured together by bolts 17 in the usual manner. The dip tube extends through the opening 14 downward into the tank and, as shown, terminates within the neck of the opening 15 which forms a sump. The opening 15 is generally closed by a plate 18 secured to the flange of the opening 15 by bolts or C-clamps (not shown).

The improved dip tube comprises, as shown in the drawings, an elongated internal metallic tube 21, and an external metallic tube 22 having an internal diameter slightly larger than the external diameter of the tube 21. The two tubes are telescopically arranged and their bottoms are joined in a manner such as will bridge the space 23 between the two tubes and form a fluid-tight joint therebetween. As shown, the bottom end of each tube 21 and 22 is welded to the upper face of an annular ring 24 by suitable welds 25. This ring has an internal diameter substantially equal to that of the internal tube 21 and an external diameter substantially equal to that of the external tube 22 so as to form substantially continuous surfaces therewith.

After the two tubes have been secured to the ring 24, a porcelain enamel or glass slip is applied to the internal surface of the inner tube, the external surface of the outer tube, the exposed surfaces of the ring 24 and the joints between the ring and tubes. The entire unit is then placed in an oven and fired at the usual temperature, generally from 1400° F. to 1800° F., to cause the slip to form an enamel coating 28 fused to the tube. Inasmuch as only one surface of each tube 21 and 22 is coated and the other uncoated surfaces of the tubes form walls of the gap 23, gases liberated from the metal may enter the gap 23 without passing through the coating being fused and may escape through the upper end of the gap 23 which is open. The result is an enameled surface having a high degree of adherence to the metal surfaces of the dip tube and substantially devoid of undesired "fish-scale."

The tube is used in substantially the same manner as that heretofore employed in the past. However, with the present structure the outer tube 22 is secured to the tank or container 10 and the internal tube 21 extends some distance above the top of the outer tube so as to permit it to be suitably capped. The outer tube 22 may be secured to the container by the usual stuffing box assembly. A similar assembly may be used to seal the cap 30 to the upper end of the internal tube 21. However, as shown in the drawing the upper end of each tube is provided with an outwardly extending flange 31. These flanges may be formed independently of the tubes and welded thereto as by welds 32. When the flanges 31 are used the enamel coating is extended to cover the lower surface of the flange on the outer tube and the upper surface of the flange of the inner tube. The flanges 31 permit the securing of the tube 22 to the container 10 by the clamping rings 16 which engage the respective flanges of the container and the tube 22 as heretofore mentioned. Suitable corrosion-resistant packing material 35 is generally interposed between the two flanges and clamping rings. A closure cap 36 is similarly applied to the upper end of the inner tube 21 to seal the tube by clamping rings 37 and bolts 38. The various clamping rings may be applied to the structure prior to the application of the coacting flanges or they may be of the usual split type which permits them to be assembled after the respective coacting flanges have been secured to the units.

I claim:

1. A dip tube for pressure vessels and the like comprising an elongated metal tube open at both ends, a second elongated metal tube open at one end and surrounding the first-named tube and having its inner wall spaced from the outer wall of the first-named tube, an annular ring secured to one end of both tubes and bridging the space between the walls of the tubes, and a continuous protective coating of fusible material fused to and covering the inner surface of the first-named tube and extending continuously around the ring at the ends of the tube and upward along the outer wall of the second-named tube.

2. A dip tube for tanks, autoclaves and the like comprising, a pair of elongated metallic tubes, each tube being open at one end thereof, one tube being mounted within the other and having its external wall spaced radially from the internal wall of the other tube to provide a space therebetween, the lower ends of both tubes being joined forming a closure for the lower end of the space between the tubes, and a glass coating fused to the inner surface of the inner tube and the outer surface of the outer tube and extending continuously from one of said surfaces around the bottoms of the tubes to the other of said surfaces.

3. A dip tube for tanks, autoclaves and the like comprising, a pair of elongated metallic tubes, each tube being open at one end thereof, one tube mounted within the other in telescoping relation thereto and having its external wall spaced radially from the internal wall of the outer tube, a metallic closing member for the space between the two tubes secured to the bottom end of the tubes and to which the tubes are secured, and a vitreous coating of corrosion resisting material covering the internal surface of the inner tube and extending continuously from such surface around the closing member and thence upward along the external wall of the outer tube, and wherein said inner tube extends upward above the top of the outer tube.

4. A dip tube for tanks, autoclaves and the like comprising, a pair of elongated metallic tubes, each tube being open at a common end thereof and provided with an outwardly extending flange at its upper end, one tube being telescopically mounted within the other and having its external surface spaced from the internal surface of such other tube thereby providing a space between the tubes, an annular ring secured to the lower end of both tubes by welds, said ring having an inner diameter equal to the inner diameter of the inner tube and an outer diameter equal to the outer diameter of the outer tube, said ring providing a closure for the space between the tubes at he lower ends thereof, the upper end of the outer tube being spaced below the flange of the inner tube, and a continuous coating of vitreous glass enamel covering the upper surface of the flange of the inner tube and extending continuously downward along the inner surfaces of such tube, the outer surface of the closure ring and thence upwardly around the outer surface of the outer tube and the under surface of the flange thereof.

5. The method of making a dip tube for tanks, autoclaves and the like comprising, inserting one elongated tube within a second elongated tube having an internal diameter slightly larger than the external diameter of the inner tube, securing one end of the tubes together with the axis of the tubes extending along a common line by welding the tubes to an annular ring having an inner diameter and outer diameter substantially equal to the inner diameter of the inner tube and an outer diameter of the outer tube respectively, applying a continuous coating of slip to the inner surface of the inner tube, the exposed surfaces of the ring and the outer surface of the outer tube, and thereafter heating the unit to cause the slip to become fused to the surfaces to which it was applied thereby forming a continuous coating thereon, the space between the tubes being open at the end opposite the secured ends of the tubes during the firing operation.

6. The method of making a dip tube for tanks, autoclaves and the like comprising, inserting one elongated tube within a second elongated tube having an internal diameter slightly larger than the external diameter of the inner tube, securing a bridge across the lower ends of the tubes to join the lower ends of the tubes together while maintaining a coaxial relation between the tubes and simultaneously closing the space between the tubes at one end thereof, thereafter applying a continuous coating of porcelain enamel slip to the inner surface of the inner tube, the outer surface of the outer tube, and the outer surface of the bridge, and thereafter firing the unit to cause the slip to become fused to such surfaces while maintaining the space between the tubes open at the upper ends to thereby form a continuous vitreous enamel coating.

7. A dip tube for a tank autoclave and the like and comprising an elongated metallic tube open at both ends, a second elongated metallic tube open at one end thereof and telescopically surrounding the first named tube with its internal wall spaced from the outer wall of the first named tube, securing means to secure the lower ends of both tubes together and provide a closure for the space between the tubes at one end thereof, the space between the two tubes at the opposite end thereof being open, a continuous vitreous coating of corrosive resistant material covering the internal surface of the first tube and extending continuously from said surface around and covering the external surface of the securing means and the external wall of the outer tube.

8. A dip tube for pressure vessels or the like comprising, a plurality of concentrically disposed metallic tubes having their walls radially spaced from one another, one end of each said tube being open with the radial spaces between said tubes at the opposite ends thereof being bridged by an annular ring secured to the ends of the tubes, and a continuous coating of corrosion-resistant material fused to the inner surface of the innermost tube and extending continuously across the outer surface of the ring and along the outer surface of the outermost tube.

9. A dip tube for pressure vessels or the like comprising, a pair of concentrically disposed metallic tubes and having their walls radially spaced from one another, one of said tubes being open at both ends and the other of said tubes being open at one end thereof, a bridging member disposed across the space between said tubes and being secured to a common end of the tubes, and a coating of vitreous enamel fused to the outer surface of the outermost tube, across said bridging member, and to the inner surface of the innermost tube.

10. A dip tube for pressure vessels or the like comprising, a pair of concentrically disposed and radially spaced metallic tubes adapted to have a common end of said tubes disposed adjacent an opening in a vessel and removably secured thereto, the opposite ends of said tubes being adapted for disposition within the vessel, an annular ring secured to said opposite ends of said tubes and bridging the space therebetween, and a corrosion-resistant coating of vitreous enamel being fused to the outer surface of the outermost tube, across the outer surface of the ring and along the inner surface of the innermost tube.

References Cited in the file of this patent

UNITED STATES PATENTS

| | | |
|---|---|---|
| 291,655 | Walsh | Jan. 8, 1884 |
| 724,675 | Decker | Apr. 7, 1903 |
| 1,053,452 | Stover | Feb. 18, 1913 |
| 1,731,171 | Miller | Oct. 8, 1929 |
| 2,535,437 | McCann | Dec. 26, 1950 |